United States Patent [19]

Ullmann et al.

[11] Patent Number: 4,739,676

[45] Date of Patent: Apr. 26, 1988

[54] DRIVE FOR A MACHINE FOR THE MANUFACTURE OF AN ELECTRODE-WORKPIECE BY MEANS OF A FORM GRINDING TOOL OF A SIMILAR SPATIAL SHAPE

[75] Inventors: Werner Ullmann, Casa San Biagio, 6644 Orselina; Andre Mathys, Ennetbüren, both of Switzerland

[73] Assignee: Werner Ullmann, Orselina, Switzerland

[21] Appl. No.: 740,836

[22] PCT Filed: Sep. 12, 1984

[86] PCT No.: PCT/CH84/00143

§ 371 Date: May 28, 1985

§ 102(e) Date: May 28, 1985

[87] PCT Pub. No.: WO85/01464

PCT Pub. Date: Apr. 11, 1985

[30] Foreign Application Priority Data

Oct. 1, 1983 [CH] Switzerland .......................... 5309/83

[51] Int. Cl.⁴ .......................... G05G 1/00; G05G 3/00; F16H 35/08
[52] U.S. Cl. .................................. 74/571 M; 74/836; 74/26; 51/157; 51/58; 219/69 V
[58] Field of Search .............. 74/26, 835, 836, 571 M; 51/157, 58; 219/69 V

[56] References Cited

U.S. PATENT DOCUMENTS

| | | | |
|---|---|---|---|
| 2,116,624 | 5/1938 | Garrett | 74/571 |
| 2,285,534 | 6/1942 | Ryan | 74/25 |
| 3,295,416 | 1/1967 | Apthorp, Jr. et al. | 74/813 R |
| 3,430,026 | 2/1969 | O'Connor | 219/69 |
| 3,663,786 | 5/1972 | O'Conner | 219/69 V |
| 3,988,864 | 11/1976 | O'Conner | 51/157 |
| 4,135,333 | 1/1979 | Stith | 51/160 |
| 4,277,915 | 7/1981 | Hausermann et al. | 51/157 |
| 4,320,599 | 3/1982 | Hill et al. | 51/58 |
| 4,557,075 | 12/1985 | Ullmann et al. | 51/58 |

FOREIGN PATENT DOCUMENTS

| | | | |
|---|---|---|---|
| 844142 | 6/1970 | Canada | 219/69 V |
| 2305269 | 10/1976 | France | |
| 474369 | 10/1967 | Japan | 74/571 M |
| 2023466 | 1/1980 | United Kingdom | |

Primary Examiner—Dirk Wright
Attorney, Agent, or Firm—Werner W. Kleeman

[57] ABSTRACT

A transmission is provided for a machine that manufactures a workpiece, later to serve as an electrode, by means of a form grinding tool. The tool has a similar spatial shape to that of the workpiece. The drive generates between the tool and the workpiece an orbital motion with changeable eccentricity and which orbital motion is necessary for a grinding or abrading process. A device, which can be structured as a transmission, an electrical control circuit, or as displaceable idling rollers, alters the eccentricity and is in constant operative connection with the driving side and power take-off side of the transmission. In this way there is obtained a constant setting or a cyclical adjustment of the eccentricity throughout the orbital movement. Furthermore, the orbital movement can describe non-circular patterns so that Lissajou patterns can be generated.

9 Claims, 4 Drawing Sheets

DRIVE FOR A MACHINE FOR THE MANUFACTURE OF AN ELECTRODE-WORKPIECE BY MEANS OF A FORM GRINDING TOOL OF A SIMILAR SPATIAL SHAPE

BACKGROUND OF THE INVENTION

The present invention broadly relates to machine drives and, more specifically, pertains to a new and improved construction of an orbital drive for a machine table.

Generally speaking, the drive of the present invention is a drive fo a machine for the manufacture of an electrode-workpiece by means of a form grinding tool of a similar spatial shape, which drive generates the orbital movement necessary for an abrading or grinding operation between the form grinding tool and the electrode-workpiece and changes the eccentricity of such orbital movement.

In other words, the drive means of the present invention is for generating between a blank for an electrode-workpiece having a first spatial configuration and a form-operating tool having a second spatial configuration similar to said first spatial configuration a relative orbital motion requisite for fabricating the electrode-workpiece from the blank by an abrading operation in an abrading machine and for altering a predetermined degree of an eccentricity of the relative orbital motion and comprises at least one motion-generating means for generating the relative orbital motion.

The construction of moulds encompasses the manufacture of moulds for pressure casting, injection molding, punching, hot forming, cold forming, and forging of materials formed of steel or other metals, plastics, and rubber as well as their respective alloys and mixtures. These moulds are frequently complicated and exhibit a three-dimensional construction. The aircraft and automobile industries especially require such type of difficult-to-manufacture forms or moulds which must be manufactured to very close tolerances. By the same method, there are also fabricated tools or construction parts (e.g. in the engine industry) of difficult to machine materials (e.g. high temperature alloys). Such moulds or complex three-dimensional parts such as engine parts are manufactured by spark erosion or electrochemical machines. The electrodes used for this purpose have the same complicated three-dimensional surface as the respective moulds or parts to be manufactured. During the course of the most recent developments, such electrodes have been manufactured on special machines. The manufacture occurs in a manner such that the electrodes are made from the solid material by means of a grinding or abrading operation or a filing operation. The material, could for instance, be graphite. The tool required for this purpose already has substantially the shape of the electrode with an over-dimensional allowance. The grinding or abrading operation or filing operation is accomplished due to a relative movement between the tool and the electrode that is to be machined from the solid piece. A grinding or abrading agent is introduced on to the surface of the tool to support the grinding or filing operation, or the tool already has a rough surface (steel with an eroded surface). Further, a fluid is introduced into the gap between the tool and the workpiece.

The relative movement is composed of two types of movement. The one type is a feed movement of the grinding or filing tool toward or away from the electrode-workpiece (usually vertical). This feed movement can also be circular (usually vertical). The other type is a circular movement of the electrode-workpiece in the horizontal plane, i.e. in a plane substantially perpendicular to the direction of the feed movement. This circular movement can also be termed orbital or planetary movement, and it can be also be spherical The radius, respectively the eccentricity, of the circular movement can be adjusted. The grinding or abrading operation is carried out until the electrode-workpiece assumes a spatial shape similar to the tool. Then the relative movements are stopped. This is achieved by a gauge, also termed depth gauge, mounted on the machine. The spatial shape of the electrode-workpiece can be made larger or smaller than the spatial shape of the tool. This is accomplished by setting the desired eccentricity of the circular or orbital movement. This known manner of manufacture of the spatial shape of the electrodes has the following disadvantages:

The eccentricity of the relative circular or orbital movement cannot be altered during the grinding or abrading operation. For this purpose the machine must be stopped.

The setting of the eccentricity is not accurately accomplished. This is so because the eccentricity has to be set at two locations of the workpiece support successively and independently of one another. Despite great care on the part of the operator, a certain amount of play cannot be avoided, so that the setting of the eccentricity at the second point will differ from that at the first point.

SUMMARY OF THE INVENTION

Therefore, with the foregoing in mind, it is a primary object of the present invention to provide a new and improved construction of a drive means which does not exhibit the aforementioned drawbacks and shortcomings of the prior art constructions.

Another and more specific object of the present invention aims at providing a new and improved construction of a drive means of the previously mentioned type which does not display the disadvantages of the known machines for the manufacture of electrodes.

Yet a further significant object of the present invention aims at providing a new and improved construction of a drive means of the character described which is relatively simple in construction and design, extremely economical to manufacture, highly reliable in operation, not readily subject to breakdown or malfunction and requires a minimum of maintenance and servicing. By using a special drive the eccentricity can be altered during the working operation, and additionally continuously, the spatial shape of the finished-machined electrode-workpiece is complementary in every way to that of the tool. With the use of a single tool it is possible to manufacture a number of workpieces of complicated spatial shape.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
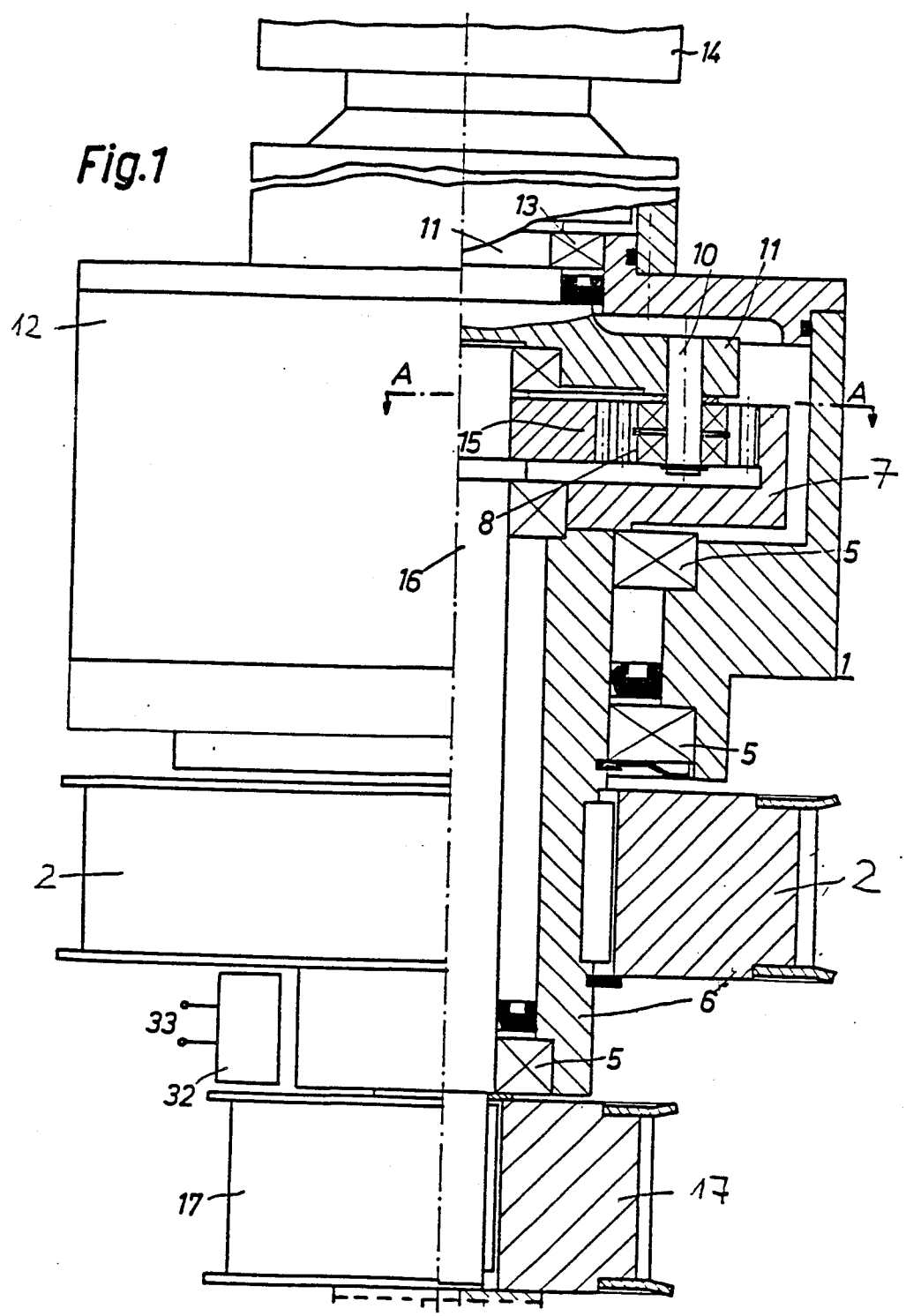
FIG. 1 shows as a first exemplary embodiment a transmission arranged between the drive motor and the drive, that generates the relative and orbital motion between the tool and the workpiece.
Figure 2:
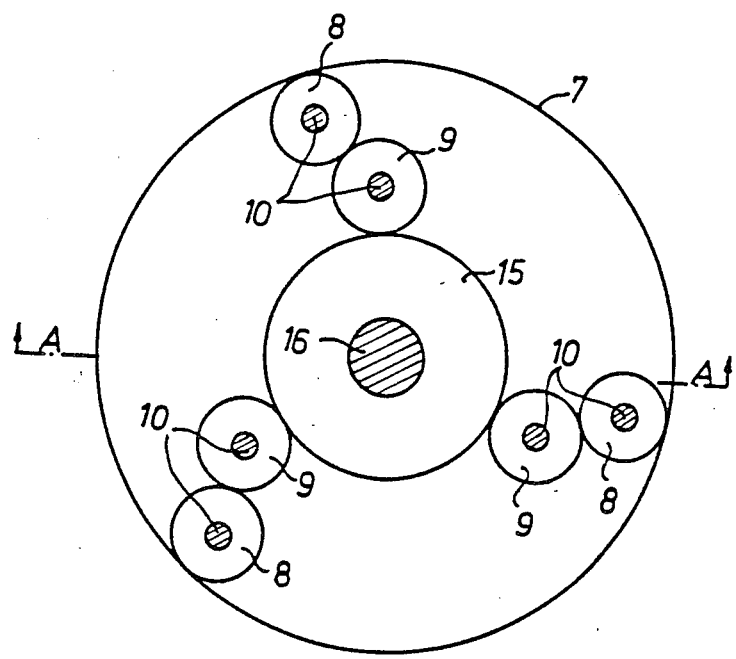
FIG. 2 shows a top plan view of the transmission taken along the section line A—A of FIG. 1.
Figure 4:
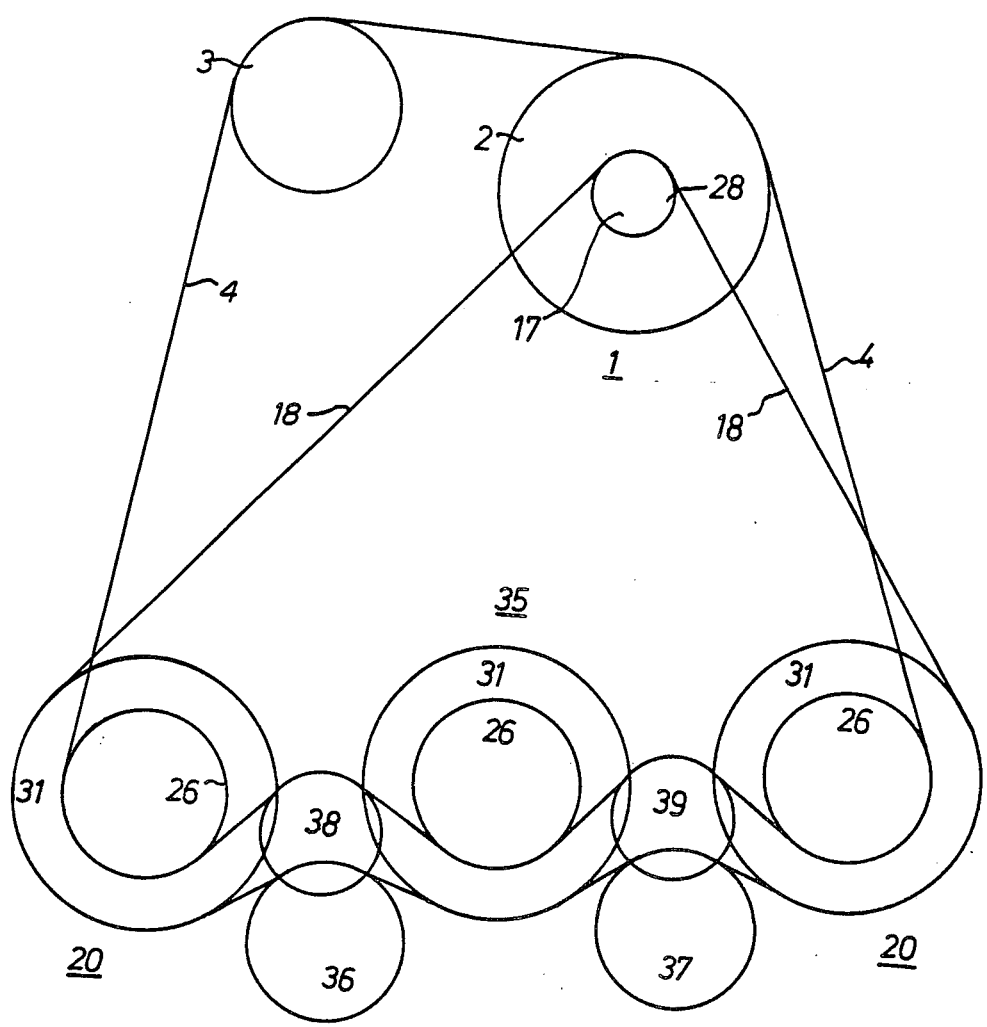
FIG. 4 shows a top plan view of the complete drive with a different exemplary embodiment of the invention.

Describing now the drawings, it is to be understood that to simplify the showing thereof only enough of the structure of the drive means has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise a transmission 1 shown in partial sectional view. A driving wheel or pulley 2, which constitutes a first mechanical power take-off means, driven by an electric motor 3 (FIG. 4) by means of a transmission belt or first connection means 4. A shaft 6, mounted in bearings 5, is connected to the driving wheel or pulley 2 by means of a key, and rotates an outer gear wheel 7 which sets idler gears 8 and 9 in rotation (FIG. 2). These idler gears 8 and 9 rotate about shafts 10 which are fixed to a construction part or machine member 11. The construction part or machine member 11 and the gears 7 and 8, 9 and an inner gear 15 are arranged in a housing 12 of the transmission 1. The construction part or machine member 11 is rotatably mounted in bearings 13 and is set into stepwise or incremental rotation by an electric stepping-motor 14. Assuming now that the stepping-motor is not in operation, the rotational shafts 10 of the idler gears 8 and 9 are in the position shown in FIG. 2. The idler gears 9 set the inner gear wheel 15 in rotation. The inner gear 15 rotates a power take-off wheel or pulley 17, which constitutes a second mechanical power take-off means fixed to its shaft 16. The power take-off wheel or pulley 17 is as shown in FIG. 4, connected to devices or motion-generating means 20 by means of a transmission belt or second connection means 18, which imparts to a machine table 21 of the grinding machine an orbital motion. Instead of a transmission belt 18 there can also be used gears to make the connection between the power take-off wheel or pulley 17 of the transmission 1, and driving wheels or pulleys 26 of the device or motion-generating means 20. The machine table 21 has either a tool or a workpiece fixed to it. Tool and workpiece perform a relative orbital motion. This will be further discussed later.

The eccentricity of this orbital movement is adjusted in the transmission or motion-altering means 1 shown in FIGS. 1 and 2. For this purpose the stepping-motor 14 is activated by means of electrical signals, either from a numerically controlled installation or by the machine operator, in order to rotate the construction part or machine member 11 and the shafts 10 of the idler gears 8 and 9 by one or more steps. Consequently, there is altered the relative rotational speed of the inner gear 15 relative to the outer gear 7. The power take-off wheel or pulley 17 experience the same change of the relative rotational speed relative to that of the driving wheel or pulley 2. The change of rotational speed between the two wheels or pulleys 2 and 17 occurs during the period in which the stepping-motor 14 moves the shafts 10. In this time period the desired amount of the eccentricity of the orbital movement is adjusted. In an example, one step of the stepping-motor 14 brings about a rotational movement of the shafts 10. This brings about an alteration of the orbital movement in the order of magnitude of less than 1 μm related to the radius of the chosen eccentricity. The eccentricity can be adjusted larger or smaller. The direction of the rotational movement of the shafts 10 relative to the rotational movement of the power take-off wheel or pulley 17 determines the setting of the eccentricity in the direction of larger or smaller values.

In FIGS. 1 a sensing means or sensor 32 is shown placed between both of the wheels or pulleys 2 and 17. Such a sensor, which determines the rotational speed of the two wheels or pulleys 2 and 17 and transmits the actual values through lines 33 to a not particularly shown but conventional control circuit, are commercially available. Therefore they will only be described in sufficient detail for understanding the described arrangement. This sensor detects the rotational speed of the two wheels or pulleys 2 and 17 magnetically, capacitatively, inductively or optically. When the rotational speed of the power take-off wheel or pulley 17 no longer coincides with the rotational speed of the drive wheel or pulley 2, due to the setting of the eccentricity, the sensing means or sensor 32 reports the change of the rotational speed through the lines 33 to the control circuit, in which the actual value of the eccentricity is compared with a predetermined reference value. When the two values coincide there is set the required eccentricity. The arrangement of the sensing means or sensor 32 at the transmission 1 of FIG. 1 does not give a very precise indication of the actual value, since the driving belts 4 and 18 and the device 20 and a device 35 can undesirably influence the eccentricity effective at the machine table 21. Therefore it is better if the sensing means 32 is mounted at the devices 20 and 35. This will be discussed in connection with FIG. 3.

FIG. 2 shows an arrangement of three pairs of idler gears 8 and 9. Each pair is offset at an angle of 120° from the other. An arrangement of two pairs with an offset of 180° is also readily possible. Three idler gears may also be placed between the gears 7 and 15.

Figure 3:
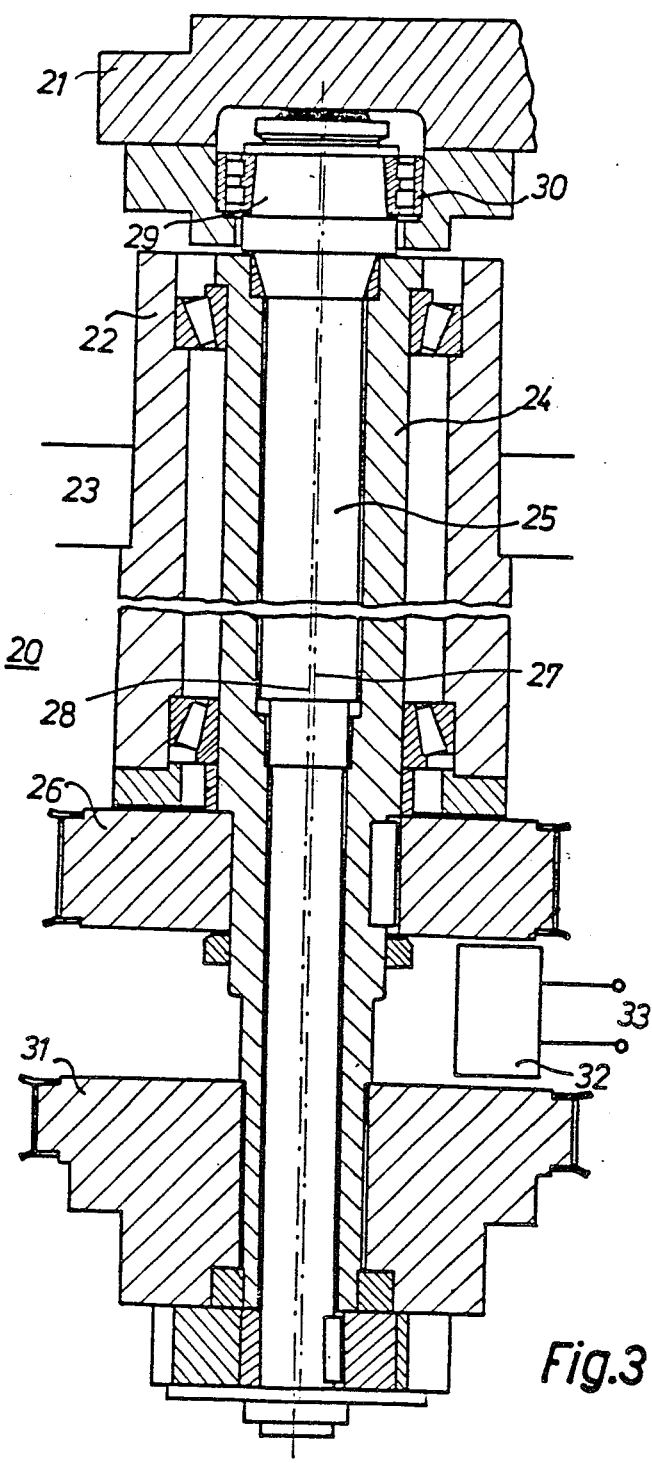
FIG. 3 shows the device for performing the relative orbital movement between the tool and the workpiece.

FIG. 3 shows the device 20 which imparts to the machine table 21 its eccentric orbital movement. The principle is described in the book "INGENIOUS MECHANISMS for designers and inventors", volume 3, fifth edition, 1959, published by the Industrial Press, New York, FIG. 28, page 294. The device comprises a housing 22, fixed to a machine frame 23, a sleeve 24 rotatably mounted in the housing 22, and a shaft 25 rotatably mounted in the sleeve 24. The sleeve 24 is set in rotation by the transmission wheels or pulleys 26 which constitute second drive means. The driving wheel or pulley 26 is connected through the driving belt 4 to the driving wheel or pulley 2 of the transmission 1, with the driving wheel or pulley of the transmission motor 3 and, if desired, with the driving wheels or pulleys 26 of the other devices 20. The shaft 25 is asymmetrically mounted in the sleeve 24 which is shown by the mutually offset rotational axes 27 and 28 of the sleeve 24 and the shaft, 25 respectively. The upper end of the shaft 25 has a crank pin 29 which is rotatably mounted in a mechanical bearig 30 of the machine table 21. A driving wheel or pulley 31, which constitutes first drive means is fixed to the lower end of the shaft 25 and connected by the transmission belt 18 with the power take-off wheel or pulley 17 of the transmission 1 and, if desired, with the wheels or pulleys 31 of the other devices 20. The shaft 25 is set in rotation by the driving wheel or pulley 17 of the transmission 1.

As long as the stepping-motor 14 of the transmission 1 is not in operation, the rotational speeds of the sleeve 24 and the shaft 25 are the same. In this condition nothing is altered.

If, the eccentricity of the orbital movement of the machine table 21 is required to be set, or is to be altered, then, as already described in connection with FIG. 1, the stepping-motor 14 is activated. The altered rotational speed of the power take-off wheel or pulley 17 of the transmission 1 is transmitted to the driving wheel or pulley 31 of the device 20 in FIG. 3, so that the shaft 25 no longer has the same rotational speed as before, but rather has a different rotational speed in relation to the sleeve 24. The shaft 25 rotates relative to the sleeve 24, so that the crank pin 29 takes up a new position. This new position is the amount of the set eccentricity. The sensing means or sensor 32 placed between the wheels or pulleys 26 and 31, detects this and sends corresponding electrical signals over the lines 33 to the control circuit in which the actual value of the eccentricity is compared to the reference value. When the two values are in agreement the required eccentricity has been set. Since the sensing means or sensor 32 has already been discussed in connection with FIG. 1, it will not be discussed further in relation to FIG. 3. The machine table 21 now carries out an orbital movement with the adjusted amount of the eccentricity. The setting or alteration of the eccentricity is accomplished while the machine is in operation, in infinitesimal steps, as often as required, and in larger or smaller increments. The eccentricity is adjusted or changed from only one point. This is particularly advantageous when a number of devices 20 are to impart an orbital motion to the machine table 21. It is unnecessary, as in the known constructions, to individually set at each device 20 the desired value of the eccentricity. In this manner the invention prevents inaccuracies from arising.

In place of the mechanical bearing 30 for the crank pin 29 in the machine table 21 as shown in FIG. 3, there can be used the known hydrostatic bearings. These have not been shown in FIG. 3 to maintain the clarity of the illustration. The advantage of the hydrostatic bearings lies in their ability to provide an automatic equalization when the value of the set eccentricity of the one device 20 differs from the value set at the other device 20. This could occur through aging after long years of service. The result of such differences of the values of the eccentricity, during the orbital movements of the machine table 21, is to introduce large differential forces, at the crank pin 29 and the mechanical bearing 30. The hydrostatic bearings 30 are connected to each other by means of a conduit and equalize these forces. This connecting line can contain a throttle with a pressure sensor that detects the pressure differences and is connected to a not particularly known but conventional control circuit that moves two tension rollers 38 and 39 toward or away from the transmission belt 18 until the pressure differences in the connecting line of the hydrostatic bearing 30 disappear and thus, the eccentricity in the devices is identical.

At this point an explanation will be given of the differing diameters of the wheels or pulleys 2 and 17 of the transmission 1 and the driving wheels or pulleys 26 and 31 of the device 20. As in the illustrated exemplary embodiment of the transmission 1, the speed of revolution of the power take-off wheel or pulley 17, because of the chosen translation, is double the speed of the driving wheel or pulley 2, this rotational speed difference is compensated by different diameters of the wheels or pulleys 2, 17, 26 and 31.

FIG. 4 shows various features. Firstly, there is shown the complete transmission 1 with a number of devices 20 for the orbital movement of the machine table 21. Here the different diameters of the various wheels or pulleys, the necessity of which was explained above, can be clearly seen. A device 35 is shown, constructed in the same way as the device 20, but with its crank pin 29 not mounted in the machine table 21, but in a not particularly shown but conventioal counterweight. This counterweight, which is placed under the machine table 21, acts as an automatic mass compensation when heavy and large workpieces are machined during such time as the radius of the orbital motion of the work table 21 is changed. FIG. 4 also shows freely movable idling rollers or pulleys 36, 37, 38 and 39. The idling rollers or pulleys 36, 37, 38 and 39 can fulfill two functions. Firstly, they serve as tension rolls that assure that the transmission belts 4 and 18 always have the proper tension. By means of weights or springs, the tension rolls can exert a continuous static force on the two transmission belts 4 and 18. Secondly, these rolls or pulleys 36, 37, 38 and 39 can be used to set or alter the eccentricity. In this case, only the rollers or pulleys 38 and 39 are required, which are fixed to a not particularly shown but conventional plunger. The plunger, which could be triggered by a numerical control circuit, and which could be displaced pneumatically, by an electro-motor, magnetically, or hydraulically, pushes the wheels or rollers or pulleys 38, 39 into or against the transmission belt 18, so that the speed of revolution of the driving wheel or pulley 31 and the shaft 25 changes relative to the speed of revolution of the sleeve 24. This occurs only in the device 20 which is in close proximity to the wheels or rollers or pulleys 38 and 39. Depending on which direction the wheels or rollers or pulleys are displaced (either towards the transmission belt 18 or away from it), the eccentricity is altered in the direction of a larger or smaller amounts. Here too, the eccentricity can be changed in infinite manner and as often as desired, in the direction of larger or smaller amounts. Since with this method only small values of the eccentricity can be set, the transmission 1 cannot altogether be dispensed with.

Figure 5:
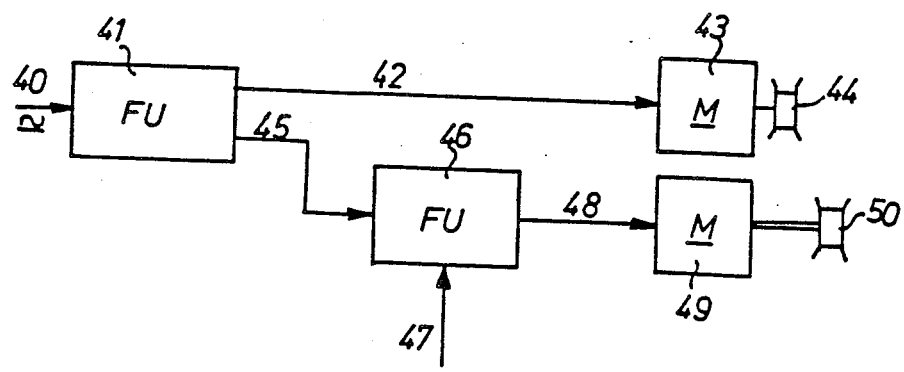
FIG. 5 shows as a further exemplary embodiment of the invention, an electrical control circuit for the device that carries out the relative, orbital movement between the tool and the workpiece.

FIG. 5 shows an exemplary embodiment of the invention that is different from the exemplary embodiment of FIGS. 1 and 4 in important aspects. In FIG. 5 no drive motor 3 for the whole drive and no transmission 1 are used; instead a frequency transformer 41 is used that is powered by a supply voltage 40. The supply voltage 40 can be the usual line voltage with an alternating current of 50 Hz or 60 Hz, or a direct-current voltage. In the latter case, in place of the frequency transformer 41, a rectifier is used. Both frequency transformers and rectifiers are well known and are offered in the marketplace by relevant manufacturers. Therefore they will not be described any further here. Both can deliver at their outputs a predetermined power at a predetermined frequency. In the exemplary embodiment of FIG. 5, a frequency transformer 41 is provided. This generates an alternating-current having a power output of 10–20 KW and a frequency of, for example 100 Hz and powers through a line 42, a synchronous motor 43, which by means of power take-off wheel or pulley 44, moves, by means of the drive belt 4, the driving wheels 26 and sleeves 24 of the devices 20 and 35 (FIGS. 3 and 4). The rotational speed of the synchronous motor 43 is controlled by the frequency transmitted through the line 42. The frequency transformer 41 supplies the same frequency, for example, 100 Hz, with a smaller power through an other line 45, to a second frequency transformer 46. If no signals appear on a control line 47, which is connected to a not particularly shown but conventional control circuit, then the second frequency transformer 46 transmits the frequency unaltered to a second synchronous motor 49 by means of the line 48. The second synchronous motor 49, via a power take-off wheel or pulley 50, the transmission belt 18, the transmission wheel or pulley 31 and the shaft 25, rotates the devices 20 and 35 (FIGS. 3 and 4). The sleeves 24 and the shafts 25 of the devices 20 and 35 have the same rotational speed, since the two motors 43 and 49 are powered with the same frequency. At this point it must be mentioned that the transmission wheels or pulleys 26 and 31 of the device 20 shown in FIG. 3, and the power take-off wheels or pulleys 44 and 50 of the synchronous motors 43 and 49 shown in FIG. 5, have the same diameter. The mentioned wheels or pulleys could have grooves which engage teeth of the drive belts 4 and 18.

To set or change the eccentricity of the orbital movement of the machine table 21, a control signal appears on the control line 47 for altering the frequency of the second frequency transformer 46. A control circuit that can generate a control signal is, for instance, described in the Swiss patent application No. 7432/82-6 (82-110). The second synchronous motor 49 receives, through the line 48, the altered frequency and therefore has a different rotational speed at the power take-off wheel or pulley 50 relative to the power take-off wheel or pulley 44 of the first synchronous motor 43. Through the transmission belt 18, the shafts 25 of the devices 20 and 35 have a different rotational speed relative to the sleeves 24, so that the crank pins 29 of the shafts 25 take up a different position. As the eccentricity is only set or changed during the time of the differing rotational speeds of the sleeve 24 and the shaft 25, the control signal is sent through the control line 47 to the second frequency transformer 46 only until the necessary eccentricity is achieved. The detection of this actual value is accomplished by the sensors 32 of FIG. 3, which transmit the actual value to a not particularly shown but conventioal comparator in the control circuit. As soon as the actual value is equal to the reference value of the eccentricity, the control signal on line 47 is removed. The second frequency transformer 46 then supplies the second synchronous motor 49 with the same frequency as the first synchronous motor 43 receives from the first frequency transformer 41, so that the sleeve 24 and the shaft 25 of the devices 20 and 35 once again have the same speed.

With the circuit arrangement of FIG. 5 it is possible to cyclically change the eccentricity in accordance with a predetermined pattern. For instance, if the workpiece is to be ground less on the side located on the X-axis side of the machine table 21 than on the side located on the Y-axis side, then during every revolution the eccentricity in the Y-axis direction must have a larger value than in the X-axis direction. The machine table 21 then carries out an orbital movement in the form of an ellipse. For every revolution of the machine table 21, two different values of eccentricity are set. In this manner the orbital movement can follow the larger part of the curves of Lissajou patterns.

While there are shown and described present preferred embodiments of the invention, it is to be distinctly understood that the invention is not limited thereto, but may be otherwise variously embodied and practiced within the scope of the following claims.

What is claimed is:

1. A drive means for generating between a blank for an electrode-workpiece having a first spatial configuration and a form-abrading tool having a second spatial configuration similar to said first special configuration a relative orbital motion requisite for fabricating the electrode-workpiece from the blank by an abrading operation in an abrading machine and for altering a predeterminate degree of an eccentricity of the relative orbital motion, comprising:
    at least one motion-generating means for generating the relative orbital motion;
    a motion-altering means for enabling continuously variably altering, during operation of said drive means, the predetermined degree of the eccentricity of the relative orbital motion; and
    connection means for constantly drivingly connecting said motion-altering means with said at least one motion-generating means.

2. A drive means for generating between a blank for an electrode-workpiece having a first spatial configuration and a form-abrading tool having a second spatial configuration similar to said first spatial configuration a relative orbital motion requisite for fabricating the electrode-workpiece from the blank by an abrading operation in an abrading machine and for altering a predeterminate degree of an eccentricity of the relative orbital motion, comprising:
    at least one motion-generating means for generating the relative orbital motion;
    a motion-altering means for continuously altering the predetermined degree of the eccentricity of the relative orbital motion;
    connection means for constantly drivingly connecting said motion-altering means with said at least one motion-generating means;
    said motion-altering means comprises a first mechanical power take-off means having a first rotational speed and a second mechanical power take-off means having a second rotational speed;
    said motion-altering means being arranged separately from said at least one motion-generating means;
    said at least one motion-generating means comprising a first drive means and a second drive means;
    said connection means comprising first connection means for constantly drivingly connecting said first drive means with said first mechanical power take-off means;
    said connection means comprising second connection means for constantly drivingly connecting said second drive means with said second mechanical power take-off means; and
    said first rotatioal speed and said second rotational speed mutually differing for altering said predetermined degree of eccentricity.

3. A drive means for generating between a blank for an electrode-workpiece having a first spatial configuration and a form-abrading tool having a second spatial configuration similar to said first spatial configuration a relative orbital motion requisite for fabricating the electrode-workpiece from the blank by an abrading operation in an abrading machine and for altering a predetermined degree of an eccentricity of the relative orbital motion, comprising:
- at least one motion-generating means for generating the relative orbital motion;
- a motion-altering means for continuously altering the predetermined degree of the eccentricity of the relative orbital motion;
- connection means for constantly operatively connecting said motion-altering means with said at least one motion-generating means;
- a power take-off gear having a first rotational speed;
- at least two idler gears each having a rotation shaft;
- said motion-altering means being constructed as a transmission;
- said transmission comprising a driving gear having a second rotational speed and a direction of motion and being in constant operative connection with said power take-off gear and at least two idler gears;
- a machine member displaceable selectively either in or counter to said direction of motion for causing an alteration of said second rotational speed relative to said first rotational speed; and
- each said rotation shaft being fixed to said machine member.

4. The drive means as defined in claim 3, wherein:
- said at least two idler gears comprise three pairs of idler gears operatively arranged between said driving gear and said power take-off gear; and
- said three pairs being mutually offset by respective angles of 120°.

5. A drive means for generating between a blank for an electrode-workpiece having a first spatial configuration and a form-abrading tool having a second spatial configuration similar to said first spatial configuration a relative orbital motion requisite for fabricating the electrode-workpiece from the blank by an abrading operation in an abrading machine and for altering a predeterminate degree of an eccentricity of the relative orbital motion, comprising:
- at least one motion-generating means for generating the relative orbital motion;
- a motion-altering means for continuously altering the predetermined degree of the eccentricity of the relative orbital motion;
- connection means for constantly operatively connecting said motion-altering means with said at least one motion-generating means;
- a machine table;
- a main drive motor;
- said motion-altering means being constructed as a trasmission;
- said transmission comprising a first drive gear and a second drive gear;
- at least one device defining a power take-off side of the drive means and comprising:
  - a sleeve;
  - a shaft eccentrically rotatably mounted in said sleeve and having an end;
  - said shaft being provided with a crank pin at said end;
  - said crank pin operatively engaging said machine table;
- said connection means comprising first connection means defining a first rotational connection operatively connecting said sleeve with said first drive gear and with said main drive motor; and
- said connection means comprising second connection means defining a second rotational connection operatively connecting said shaft with said second drive gear.

6. The drive means as defined in claim 5, further including:
- a further device defining a drive side of the drive means;
- an element arranged between said further device and said transmission for influencing said second connection means for altering a rotational speed of said shaft relative to said sleeve.

7. The drive means as defined in claim 5, wherein:
- said at least one device contains a sensing means;
- said driving second gear defining a power take-off gear having a drive speed;
- said drive speed being subject to an alteration;
- said machine table performing the relative orbital motion;
- the predetermined degree of eccentricity of the relative orbital motion assuming an actual value; and
- said sensing means serving for detecting said alteration of said drive speed of said power take-off gear and for thereby detecting said actual value of the predetermined degree of eccentricity of the relative orbital motion of said machine table.

8. The drive means as defined in claim 5, wherein:
- said at least one device comprises a number of devices;
- each device of said number of devices comprising hydrostatic bearing means for hydrostatically mounting said crank pin in said machine table;
- said hydrostatic bearing means being subjected to a pressure;
- said pressure being subject to a variation;
- lines containing at least one pressure detector and operatively interconnecting said number of devices; and
- said pressure detector having means for influencing said second connection means in response to said variation of said pressure of said hydrostatic bearing means until the pressure differential is zero and the predeterminate degree of eccentricity is the same in each at said least one device.

9. The drive means as defined in claim 5, further including:
- a sensing means;
- said at least one device containing said sensing means;
- said second drive gear defining a power take-off gear having a drive speed;
- said drive speed being subject to an alteration;
- said machine table performing the relative orbital motion;
- the predetermined degree of eccentricity of the relative orbital motion assuming an actual value; and
- said sensing means serving for detecting said alteration of said drive speed of said power take-off gear and for thereby detecting said actual value of the predetermined degree of eccentricity of the relative orbital motion of said machine table.

* * * * *